Nov. 27, 1934.    P. O. MIKUT    1,982,530
METHOD OF PROJECTING CINEMATOGRAPHIC PICTURES IN NATURAL COLORS
Filed July 29, 1933
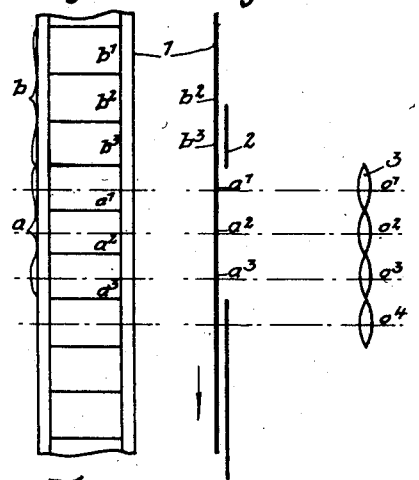
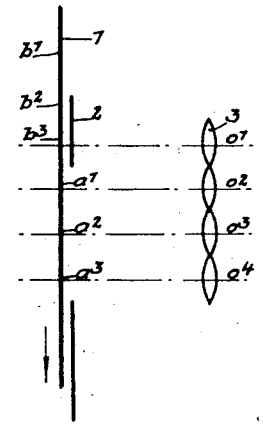
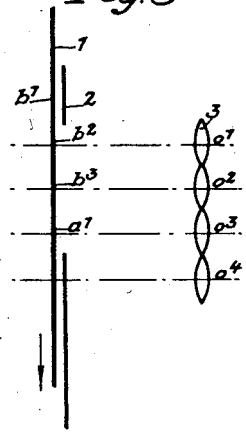
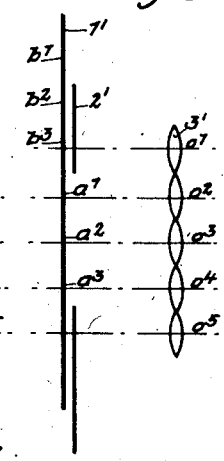
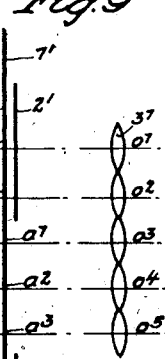
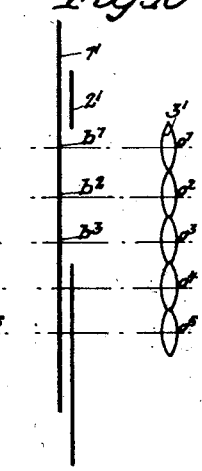
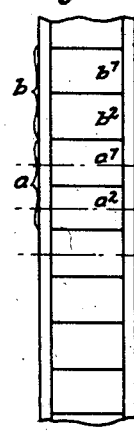
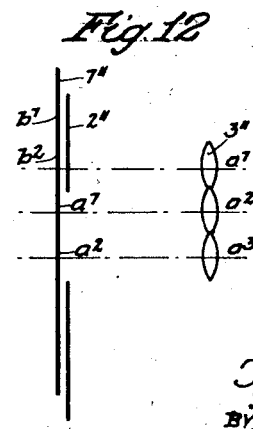
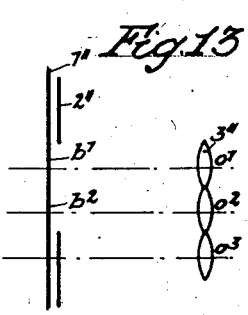
Inventor:
Paul Oskar Mikut
BY
ATTORNEY Patented Nov. 27, 1934

1,982,530

UNITED STATES PATENT OFFICE 1,982,530

METHOD OF PROJECTING CINEMATOGRAPHIC PICTURES IN NATURAL COLORS

Paul Oskar Mikut, Dresden, Germany

Application July 29, 1933, Serial No. 682,863
In Germany February 12, 1931

2 Claims. (Cl. 88—16.4)

This invention relates to a method and device for projecting cinematographic pictures in natural colors.

According to the theory of color synthesis, it is necessary in cinematographic additive two or three color projection to simultaneously reproduce the simultaneously taken partial pictures and to simultaneously move them out of the path of the rays. Since the black-and-white picture, owing to its development, will always continue to exist beside the color picture, it is advisable to arrange the additive partial pictures one behind the other on the film so as to be able to alternately reproduce both kinds of film by means of a single projector.

It is generally known that the film increases in length according to the number of partial pictures. Simultaneous motion of the partial pictures disposed one behind the other on the film is still connected with difficulties in the known kind of apparatus, and the intermittent motion of the film to the extent of two heights of image causes in the gears of the known type of projector acceleration, which is highly injurious in continuous operation, and the simultaneous projection of three partial pictures increases this acceleration still more. The difficulties involved in altering motion to the extent of one picture height are well known with respect to the optical compensation of the picture travel, and they will increase many times in case of a triple picture stroke.

To avoid these troubles it has been proposed already to move the film only to the extent of the height of one picture and to project the various partial pictures by means of three lenses, i. e., to let the partial pictures with their color values pass subsequently through the apparatus. Other proposals in this respect dealt with altering the order of colors so as to keep the color values constant during transition from one phase to another. It is further known to make use of two color cinematography and to throw the missing third color on the screen during darkening by means of the covering disc or to bring out, between two differently colored partial pictures of one phase, during the next phase a partial picture in the third color. These known methods suffer, however, from the drawback that troublesome colored borders appear during a change of phase. It has been attempted to eliminate these disturbing borders by repeated successive printing of the various groups of phases on the film and subsequent repeated projection of the closed groups by means of rapid projectors, but this method is highly uneconomical and can be carried out only by few apparatuses. Moreover, the colored borders can also be eliminated only by darkening during transition from one phase to another, and this involves flickering.

To bring about the illusion of moving pictures it is necessary to render the motion of the film itself which carries the pictures invisible by cutting off the light rays from the screen while the film moves. Thus illumination of the screen alternates with intervals of darkening, and this change between light and dark must take place 30 to 40 times per second to prevent flickering, and it would therefore be necessary to project approximately 200 pictures per second to attain this object. By repeated projection of one and the same phase of motion in modern apparatus this frequency of light fluctuations is favorably influenced. With respect to intermittently operating projectors, the number of dark intervals is three times as great as that of picture phases. If a picture phase is projected three times, complete elimination of flickering is insured already at fifteen changes of phase. Furthermore, the change of phase relative to the stoppage of the picture is effected in a very short time, the ratio changing from 1:4 to 1:12. It has further been found that it is very difficult to meet the demand for the simultaneous removal of three partial pictures from the course of rays, as required by three color cinematography.

The invention avoids all these drawbacks connected with known processes and proposes to move the partial pictures of one phase individually out of the light path and to project the picture phase comprising several partial pictures as closed phase until the next group of partial pictures is ready for projection. This object is attained by the invention by means of travelling masks which are known already in projection apparatuses with optical compensation of the picture travel, and which are adapted to the requirements of the invention. In case of intermittent projection the masks travel intermittently also and, in case of continuous projection, spirally. Therefore, according to the invention, each group of partial pictures is continued during projection at least for one picture height in excess of the number of partial pictures present, or, in other words, each group of pictures on the film and of the same phase of motion is projected several times as closed group. This new method affords the advantage of being better adapted to the laws of intermittent picture travel than is possible with respect to the known large blackand-white projectors. Furthermore, the invention for the first time permits projection corresponding to the theory of the additive color synthesis and the laws of cinematography. For applying the new process projectors can be used, in which the limitation of the picture in the gate aperture is effected by means of travelling masks accompanying the partial pictures farther to the extent of one picture height than there are partial pictures present, or by means of devices in which a travelling objective follows the picture phases over several gate apertures. Projectors may have intermittent or continuous picture travel, the description of the examples given below assuming, for the sake of better understanding, that the devices stop during projection. The construction of the apparatuses will be the simpler, the smaller the area is that has to be covered by the film in the gate aperture. In the first constructional embodiment shown a form of projection deviating from the theory of the additive color synthesis will be described.

In the accompanying drawing, the displacement of the picture carrier with the picture phases thereon and its position relative to the objective lens for the projector shown as a single line is diagrammatically represented.

Figures 1 to 3 show a part of the film.

Figures 4 to 6 show the course of the projection phase in case four objective lenses are used, Figures 7 to 10 show the same course if five objective lenses are used and Figures 11 to 13 show the same procedure with respect to stereo and two color projection.

Since the blue partial color or the blue partial picture can be used as complementary color, it is possible in additive three color projection, by applying the method according to the invention, to obtain an almost complete color projection without troublesome colored borders or spectra if using only four masks. If, according to the invention, only one objective lens more is employed than are partial pictures present and if stopping down takes place so that always after two projections of complete groups of partial pictures at the third projection, i. e., only once with two pictures of coinciding phase of a group, the blue partial picture of an adjacent group of another phase of motion becomes effective, the blue borders appearing at each third projection and due to the blue picture belonging to the next phase of motion will not be troublesome. During projection, the process shown in Figs. 4 to 6 will take place.

In all figures, 1 is the film or picture carrier on which the pictures $a$, $b$, and so forth are arranged. A plurality of pictures $a1$, $a2$, $a3$ etc. form one picture phase. 2 is the covering with the gate apertures extending over three pictures and disposed in front of the picture carrier 1 while the numeral 3 denotes the objective lenses $o1$, $o2$, $o3$ etc. Fig. 1 shows the front of the film. In Fig. 4, the partial pictures $a1$, $a2$, $a3$ of the phase of motion $a$ are at first reproduced through the stationary projection lens $o1$, $o2$, $o3$ and through the first opening of the shutter. If the film 1 is moved to the extent of one picture height, the same phase will be produced one field lower, while simultaneously the covering or mask 2 must be moved down to the same extent. Projection then takes place through the objective lenses $o2$, $o3$, $o4$, and the position according to Fig. 5 will then be attained. If the film 1 is moved for an additional picture height in the direction of the arrow and the covering 2 with the gate apertures moved back one picture height, as indicated by Fig. 6, the pictures $b2$, $b3$, $a1$ taken from two phases of motion will be simultaneously projected through the objective lenses $o1$, $o2$, $o3$. At the next operation the film 1 again moves farther to the extent of one picture height, and all partial pictures $b1$, $b2$, $b3$ of the picture phase will be projected by the objective lenses $o1$, $o2$, $o3$. This process is continually repeated, i. e., a complete group of pictures of the same phase is always projected twice while one group formed from two different picture phases is projected only once. Since in this way there is always only one color for reciprocal action, colored borders or spectra, especially if the blue color be used, will not become apparent to the eye.

If in case of the stationary objective lenses 3 a number of objective lenses is used in additive two or three color projection that is smaller by one than the double number of partial pictures of each group, only picture groups of coinciding phase can be projected. All partial pictures will always be fully covered, particularly in the parts reproducing moving objects. This is shown in Figs. 7 to 10. Fig. 2 is a front view of the film 1' with the various partial pictures. At first, there are projected, for example, the partial pictures $a1$, $a2$, $a3$ of the picture phase $a$ by means of the stationary objective lenses $o1$, $o2$, $o3$ through the first opening of the mask 2' (Fig. 7). When the film 1' is moved to the extent of one picture height and the mask 2' moved also, the partial pictures will be produced one field lower by means of the objective lenses $o2$, $o3$, $o4$ (Fig. 8). During further motion of the film 1' and the mask 2' to the extent of another picture height, the picture will be projected through the objective lenses $o3$, $o4$, $o5$ (Fig. 9). All other partial pictures and objective lenses 3' will be covered by the mask 2'. During subsequent backward travel of the mask 2' the three partial pictures $b1$, $b2$, $b3$ of the next phase of motion will be projected through the objective lenses $o1$, $o2$, $o3$ (Fig. 10). Then the cycle begins anew, the mask 2' releasing during subsequent motions of the film the phase of motion $b$.

In additive two color projection as well as in stereo projection only two partial pictures are required for applying the method. These two simultaneously taken partial pictures, according to the invention, are also printed once on the film, one behind the other. It has been proposed already in connection with stereo projection to individually and successively project the partial pictures following one another on the film, but that would destroy the completeness of the various phases while it is just this kind of projection which, according to the invention, increases the stereoscopic effect in stereo projection. It is immaterial whether the partial pictures are made visible to the eye by the anaglypic or any other process. The procedure is shown in Figs. 11 to 13. Fig 3 shows again the film 1''. 2'' is the mask and 3'' are the objective lenses. First the partial pictures $a'$, $a''$ of the phase of motion $a$ are projected through the objective lenses $o1$, $o2$ (Fig. 11). If the film 1'' with the mask 2'' has travelled farther to the extent of one picture height, the picture phase $a$ with its partial pictures $a1$, $a2$ will be in front of the objective lenses $o2$, $o3$ (Fig. 12). After the second travel of the film 1'' and a corresponding moving back of the mask 2'' the partial pictures $b1$, $b2$ of the picture phase $b$ will be projected through the objective lenses o1, o2, as indicated by Fig. 13.

The examples cited show that the new method can be applied to all color and stereoscopic processes, no matter whether the projectors are of the intermitent or continuous type. It is of course possible to adapt the construction of the device to the method of projection concerned without deviating from the spirit of the invention.

I claim:—

1. A method of projecting cinematographic pictures in color which comprise separately and simultaneously projecting the component images of a simultaneously exposed color series in register on a screen, feeding the film a single frame and again projecting the same series of images in the same place as before, feeding the film another step, said projections being made at the rate required of motion pictures and repeating the projecting and feeding steps for each series of color records.

2. A method according to claim 1, which consists in twice projecting, in three color projection work, each picture group comprising three partial pictures and in once projecting, after each repetition, three partial pictures of two adjacent picture groups representing different phases of motion so as to render always the same color of the second phase effective in double phase projection.

PAUL OSKAR MIKUT.